(No Model.)
C. V. BOYS.
ELECTRIC METER.
No. 256,965. Patented Apr. 25, 1882.
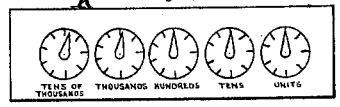
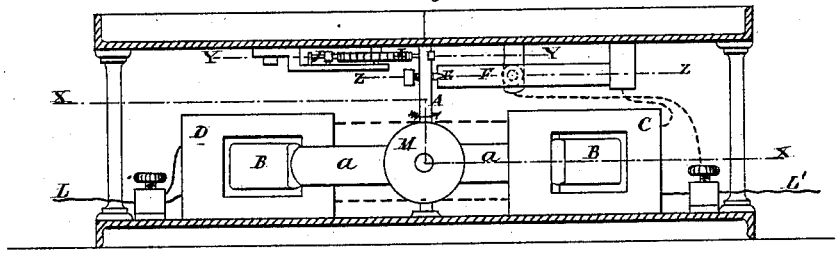
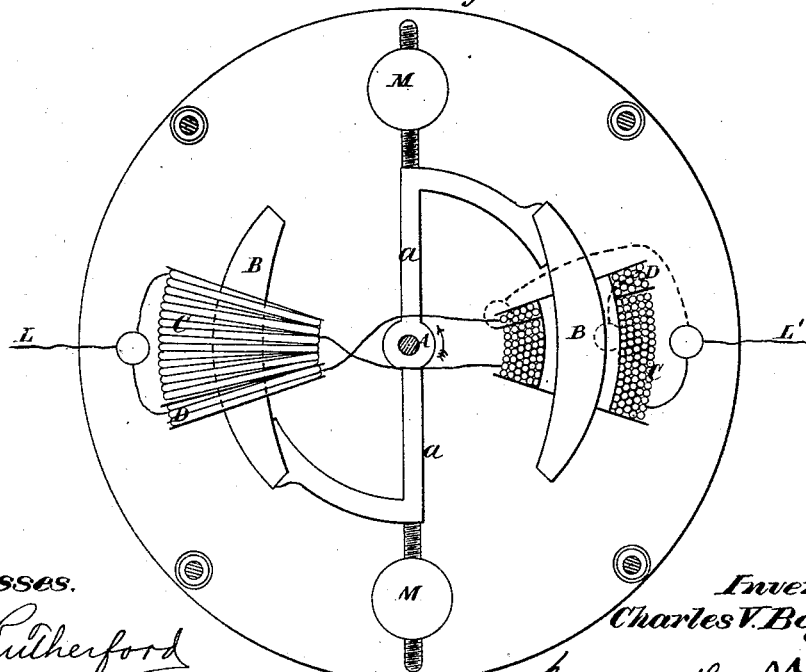
Witnesses.
J. A. Rutherford
Robert Gowett
Inventor.
Charles V. Boys.
By James L. Norris,
Atty.

UNITED STATES PATENT OFFICE.

CHARLES V. BOYS, OF WING, NEAR OAKHAM, COUNTY OF RUTLAND, ENGLAND.

ELECTRIC METER.

SPECIFICATION forming part of Letters Patent No. 256,965, dated April 25, 1882.

Application filed February 2, 1882. (No model.) Patented in England October 13, 1881.

*To all whom it may concern:*

Be it known that I, CHARLES VERNON BOYS, a citizen of England, residing at Wing, near Oakham, in the county of Rutland, England, have invented a new or Improved Electric Meter, (for which I have obtained a patent in Great Britain, No. 4,472, bearing dated October 13, 1881,) of which the following is a specification.

In my application for Letters Patent No. 47,358, filed 8th December, 1881, I described an electric meter consisting of clock-work governed by a pendulum or balance having its oscillations determined by the force of an electro-magnet the coils of which are in an electrical circuit. The number of oscillations in a given time registered by a counter driven by the clock-work indicates the quantity of electricity passed through the circuit. I described also remontoir apparatus for keeping the clock-work wound up, this apparatus being worked by an electro-magnet in a shunt brought into circuit when the clock-work becomes to a certain extent run down. I have now simplified the construction and arrangement of my electric meter, and will describe the modified form of the instrument as the invention for which I now seek further Letters Patent.

Figure 1 of the accompanying drawings is a side view. Fig. 2 is a plan on X X; Fig. 3, a plan on Y Y; Fig. 4, a plan on Z Z; and Fig. 5 is a plan of the counter which registers the number of oscillations.

An axis, A, has two arms, $a\,a$, to which are attached segmental pieces of iron B B, that can move freely through coils C C of insulated wire, and through smaller coils D D at the sides of these. On the axis A is a projecting stud, E, which, as the axis turns in the direction of the arrow, meets a light spring, F, and bends it so as to make momentary contact with a pin, G, the stud E then escaping the spring F. There is also on the axis A a spring-pawl, H, which engages with the teeth of a ratchet-wheel, I, and turns it one tooth round at each reciprocation of the axis. Another spring-pawl, J, prevents the wheel I from turning backward. The axis of the wheel I works an index of a counter, K, and by suitable gearing works other indices of the counter, so as to register by units, tens, hundreds, &c., the number of oscillations of the axis A. The conductors L L′ of the circuit to which the instrument is applied are always in connection with the wire of the two larger coils C C, and one of the conductors, L, is always in connection by a branch with one end of the wire of the smaller coils D D, the other, L′, being connected to the pin G, while the other end of the wire of the small coils D D is connected to the spring F.

The apparatus works as follows: A current of electricity passing through the circuit L L′ excites the coils C C, and the segments B B are then in the condition of the balance of a watch, oscillating to and fro within the coils with a velocity greater or less, according as there is more or less electricity passing through the coils C C. If there were no friction or other resistance, the segments B B, if once caused to oscillate, would go on oscillating as long as C C remained excited; but as the friction and other resistances would in time stop their movement the smaller coils D D serve to give the segments an impulse in every to-and-fro oscillation, and thus to maintain their motion. For this purpose the stud E on the axis A is so arranged relatively to the contact-spring F that when the segments B B are about the middle of their stroke in one direction the spring F is caused to make contact with the pin G, so that a portion of the electrical current is transmitted for a moment through the smaller coils D D, and this gives the segments B B an impulse in the direction in which they are moving. Obviously there might be other smaller coils, such as D D, on the other sides of the larger coils C C, and another contact-pin, such as G, on the other side of the spring F, so that the segments B B might receive an impulse in both directions of their motion. The oscillating axis A, by means of the pawl J, gives at every oscillation a motion to the ratchet-wheel I, and the counter K records the number of oscillations performed in a given time, this number being greater or less, according as a greater or less quantity of electricity has during the time passed through the conductors L L′, so that the indication given by the counter is a measure of the electricity that has passed the instrument. By means of weights M, adjustable on the arms $a\,a$, which carry the segments B B, their rate of oscillation under a given electrical force may be regulated.

Having thus described the nature of my invention and the best means I know of carrying it into practical application, I claim—

1. In an electric meter, the combination, substantially as described, of iron segments, an oscillating axis with which they are connected, hollow coils in which the segments reciprocate, and a counter operated by the oscillations of the axis for measuring the current of electricity passing through the coils.

2. The combination, substantially as herein described, of an oscillating axis, iron segments connected therewith, hollow coils in which the segments reciprocate, a counter operated by the oscillations of the axis, and additional coils and a contact maker and breaker, essentially as and for the purposes set forth.

In testimony whereof I have signed my name to this specification, in the presence of two subscribing witnesses, this 18th day of January, 1882.

CHARLES VERNON BOYS.

Witnesses:
   J. WATT,
   W. RIMELL,
*Both of 17 Gracechurch Street, London.*